United States Patent [19]
Smith

[11] 3,935,348
[45] Jan. 27, 1976

[54] METHOD OF BONDING SILICONE RUBBER TO A PRIMED SURFACE

[75] Inventor: Christopher John Smith, Llanishen, Wales

[73] Assignee: Dow Corning Limited, Barry, Wales

[22] Filed: Feb. 14, 1974

[21] Appl. No.: 442,560

[30]      Foreign Application Priority Data
         Feb. 20, 1973   United Kingdom................. 8162/73

[52] U.S. Cl. ................ 427/408; 156/308; 156/338; 427/413; 428/447
[51] Int. Cl.². C09J 5/02; B32B 25/20; B32B 21/08; B32B 13/12
[58] Field of Search..... 117/77, 122 PS; 156/110 A, 156/308, 338; 161/206; 260/734; 427/407, 408, 413; 428/447

[56]             References Cited
             UNITED STATES PATENTS
1,617,588   2/1927   Geer ............................... 156/338 X
2,340,452   2/1944   Child et al. ........................... 117/72
2,414,018   1/1947   Carson ............................... 260/734
2,424,736   7/1947   Brams ............................ 260/734 X
2,979,420   4/1961   Harper ............................... 117/72
3,702,778   11/1972  Mueller et al. ........................ 117/75

Primary Examiner—Douglas J. Drummond
Assistant Examiner—Robert A. Dawson
Attorney, Agent, or Firm—Robert F. Fleming, Jr.

[57]             ABSTRACT

Method for bonding a room temperature vulcanisable silicone rubber to a porous substrate of masonry or wood. The method involves applying to the porous substrate a primer composition comprising a cyclised rubber resin, an organic solvent and a film-forming polyester resin in a proportion of from 0 to 40% by weight based on the weight of cyclised rubber resin. The primed surface is dried and a room temperature vulcanisable silicone rubber composition of specified type then applied.

5 Claims, No Drawings

METHOD OF BONDING SILICONE RUBBER TO A PRIMED SURFACE

This invention relates to a method for improving the adhesion of silicone rubbers to porous substrates.

Room temperature vulcanising silicone rubbers represent a well-known and widely employed class of commercial products. Among the applications for which they are employed are those involving their use as adhesives, sealants and coating materials. Although they perform satisfactorily in most such applications they sometimes suffer from a lack of adequate adhesion to the substrate to which they are applied. In an attempt to improve the bonding of the rubber to the substrate various compositions based on silanes have been proposed as primers for the substrate. Known primers, however, lead to successful bonding with only a limited number of substrate types. In particular the adhesion of certain silicone building sealant compositions to porous masonry, especially green (freshly hardened) concrete, has left something to be desired.

We have now found that the bonding of certain room temperature vulcanisable silicone rubbers to porous substrates of masonry or wood may be improved by employing as a priming coat for the substrate a composition based on a cyclised rubber.

According to this invention there is provided a method of producing a porous masonry or wood substrate having bonded thereto a silicone rubber which comprises (1) applying to the surface of a porous substrate which is of masonry or wood a coating of a primer composition comprising (a) a cyclised rubber resin (b) from 0 to 40% by weight, based on the weight of (a), of a film forming polyester resin which is compatible with (a), and (c) a volatile organic solvent, the solvent (c) comprising from 45 to 80% of the total weight of the primer composition, (2) drying the applied coating and (3) applying to the primed surface a room temperature vulcanisable silicone rubber composition as hereinafter defined.

The cyclised rubber resins which constitute component (a) of the primer compositions used according to this invention are well-known materials. They may be described as organic solvent-soluble cyclisation products of natural rubber. As a result of a cyclisation reaction the long chain-like molecules of rubber are converted to condensed ring systems. Cyclised rubber resins, their properties and methods of preparation are described more fully at pages 336 to 340 of Fibres, Films, Plastics and Rubbers by W. J. Roff and J. R. Scott, published 1971 by Butterworth and Company.

The primer composition is applied to the substrate in the form of a solution or dispersion in a volatile organic solvent (c). Any solvent for the cyclised rubber which is sufficiently volatile to evaporate in a reasonable time under the application conditions can be used. Suitable solvents include, for example, aromatic and aliphatic hydrocarbons and chlorinated hydrocarbons, e.g. xylene, toluene, pentane, hexane, benzene, petroleum ether and white spirit. Solvents other than hydrocarbons and chlorinated hydrocarbons, for example, methylethyl ketone, may also be present. When drying of the primer coating is required to take place at normal ambient temperatures and pressures the organic solvent employed should preferably have a boiling point below about 125°C at 760 mm.Hg. Mixtures of two or more organic solvents may be used if desired to achieve optimum wetting of the substrate and/or drying of the coating.

Up to 40%, preferably from 5 to 20%, by weight, based on the weight of (a), of a polyester film forming resin (b) may be incorporated into the primer composition. In general the incorporation of such a resin is preferred as this improves the wetting out and film forming properties of the primer composition. Any film forming polyester resin which is compatible with the cyclised rubber (a) can be employed. By 'compatible with' we mean that the resin can be taken into solution with the cyclised rubber to form a substantially homogeneous system. Preferred as the compatible polyester resins are the air drying alkyd resins especially those modified with linseed oil and/or dehydrated castor oil for example DCO/linseed oil modified pentaerythritol ester and DCO modified pentamaleic ester. When a film forming resin is included in the primer composition it is often advantageous to include driers, e.g. cobalt naphthenate and lead naphthenate to expedite drying of the applied film. Suitable driers and the proportions in which they may be employed to give the desired drying time can be readily ascertained by those skilled in the art.

The organic solvent component should comprise from 45 to 80% of the weight of the primer composition. A preferred composition for use according to this invention comprises by weight from 25 to 40% of the cyclised rubber (a) and from 3 to 15% of a film-forming alkyd resin (b), the remainder being one or more volatile organic solvents, and optionally one or more driers for (b). A mixture of xylene and petroleum ether is particularly preferred as the solvent component.

Drying of the prime coating can be carried out, for example, by exposure to the atmosphere or may be hastened by the application of heat and/or reduced pressure.

Following the drying step there is applied to the applied coating a room temperature vulcanisable silicone rubber composition. This composition should be one of the three following types, namely A. Vulcanisable organosiloxane compositions based on an organosiloxane polymer having in the molecule silicon-bonded oxime radicals, and/or a mixture of an organosiloxane polymer having silanol groups and a silane having at least 3 silicon-bonded oxime groups. Such compositions are well-known in the art and are described, for example, in U.K. Pat. Nos. 975,603 and 990,107.

B. Vulcanisable organosiloxane compositions based on an organosiloxane polymer having terminal silicon-bonded acyloxy groups, and/or a mixture of a silanol-terminated organosiloxane polymer and a silane having at least 3 silicon-bonded acyloxy groups per molecule. Such compositions are well-known in the art and are described for example in U.K. Pat. Nos. 862,576, 894,758 and 920,036.

C. Vulcanisable compositions based on an organosiloxane polymer having terminal silicon-bonded amido or amino groups, and/or a mixture of a silanol-terminated organosiloxane polymer and a silylamine or silylamide. Such vulcanisable compositions are described, for example, in U.K. Pat. Nos. 1,071,211, 1,078,214 and 1,175,794.

The vulcanisable organosiloxanes are allowed to cure on contact with the primed substrate whereby a porous substrate having a silicone rubber composition bonded thereto is obtained. Curing of the vulcanisable organosiloxanes may be effected by exposure to moisture, the moisture present in the ambient atmosphere normally being sufficient for this purpose.

The process of this invention provides a means of bonding the defined room temperature vulcanising compositions to a porous masonry or wood substrate. It is of particular interest with regard to improving the adhesive bond between silicone rubber sealants and cement or concrete surfaces in building structures.

The invention is illustrated by the following examples:

EXAMPLE 1

A primer composition was prepared by mixing the following materials:

| | | |
|---|---|---|
| Cyclised rubber resin (Plastoprene No.1) | 40% | by weight |
| Xylene | 40% | " |
| Petroleum ether 40/60 | 20% | " |

This composition was then applied as a thin film to a new cement surface obtained from a 3 : 1 sand/cement mix, and the composition allowed to air dry for one hour. To the dried primer film was then applied a layer of a vulcanisable organopolysiloxane consisting of a mixture of, by weight,

| | |
|---|---|
| Hydroxy-terminated polydimethylsiloxane in which about 10% of the total hydroxy radicals are replaced with $(CH_3)_3SiO-$ radicals (12,000 cS at 25°C) | 100 parts |
| $(CH_3)Si[ON=C(CH_3)_2]_3$ | 7 " |
| Silica Filler | 10 " |
| Dibutyltin dioctoate | 0.3 " |

The applied composition was allowed to vulcanise at room temperature (20°C) for 7 days. After this period the rubber was found to be firmly bonded to the cement.

When the process was repeated employing an unprimed cement surface the adhesion between the rubber and the surface was found to be poor.

EXAMPLE 2

A primer composition was prepared by mixing the following materials:

| | | |
|---|---|---|
| Cyclised rubber resin (Plastoprene No.1) | 32% | by weight |
| Xylene | 40% | " |
| Alkyd resin (66% w/w in xylene) (Vilkyd 201 X66) | 12% | " |
| Petroleum ether 40/60°C | 16% | " |

This composition was applied to a new cement surface as described in Example 1 and allowed to air dry for one hour. To the dried primer was then applied a layer of the vulcanisable composition described in Example 1. Good adhesion was obtained between the vulcanised rubber and the cement surface. Failure of the bond occurred as tearing of the rubber.

EXAMPLE 3

A primer composition was prepared by mixing by weight

| | |
|---|---|
| Cyclised rubber resin (Plastoprene No.1) | 34.5% |
| Alkyd Resin (66% w/w in xylene) (Vilkyd 201 X66) | 5.8% |
| Xylene | 42.0% |

-continued

| | |
|---|---|
| Petroleum Ether 40/60°C | 17.3% |
| Cobalt naphthenate (6% Co) | 0.04% |
| Lead naphthenate (30% Pb) | 0.10% |

Cement test blocks of dimensions 50 × 50 × 25 mm. were prepared according to the method described in DIN 18-540 4.4.1. After preparation, curing and drying at 110°C the blocks were wrapped in newspaper and stored at normal ambient temperatures until required for use. The concrete blocks thus prepared were employed after 4 weeks to produce 'H' piece assemblies by the method described in BS 4254 : 1967 Appendix C. The sealant bead in the test pieces was obtained by applying the vulcanisable composition described in Example 1 and allowing the composition to cure by exposure to the ambient atmosphere for 7 days. Prior to the application of the sealant bead the whole of the appropriate 50 × 50 mm. test surfaces on the cement blocks to be used in the 'H' assembly were coated with the primer composition described above in this Example. The primer composition was allowed to air dry for about 3 hours before application of the vulcanisable composition to the primed surface.

Several of the 'H' assemblies thus prepared were positioned in the jaws of a tensile testing machine and the cement blocks pulled apart to extend the rubber bead by 100%, that is to a thickness of 24 mm. Spacers of 24 mm. thickness were then inserted between the cement blocks to maintain the extension at 100%. After 24 hours no cohesive or adhesive failure had occurred in the test piece. Using the tensile testing machine other similar test pieces were extended until breakage occurred. The failure was cohesive, the extension at break averaging approximately 350%.

The above test procedure was also carried out on 'H' assemblies which had been subjected to immersion in lime solution at 70°C for 7 days. No failure occurred after 24 hours of 100% extension.

That which is claimed is:

1. A method of producing a porous masonry or wood substrate having bonded thereto a silicone rubber which comprises (1) applying to the surface of a porous substrate which is of masonry or wood a coating of a primer composition comprising (a) a cyclised rubber resin, (b) from 0 to 40%, based on the weight of (a), of a film forming polyester resin which is compatible with (a), and (c) a volatile organic solvent, the solvent (c) comprising from 45 to 85% of the total weight of the primer composition, (2) drying the applied coating and (3) applying to the primed surface a room temperature vulcanisable silicone rubber composition selected from the group consisting of (I) compositions based on an organosiloxane polymer having in the molecule (A) silicon bonded oxime radicals, (B) a mixture of an organosiloxane polymer having silanol groups and a silane having at least 3 silicon-bonded oxime groups per molecule, or (C) a mixture of (A) and (B), (II) compositions based on (D) an organosiloxane polymer having terminal silicon-bonded acyloxy groups, (E) a mixture of a silanol-terminated organosiloxane polymer and a silane having at least 3 silicon-bonded acyloxy groups per molecule, or (F) a mixture of (D) and (E), and (III) compositions based on (G) an organosiloxane polymer having terminal silicon-bonded amido or amino groups, (H) a mixture of a silanol-terminated organosiloxane polymer and a silylamine or silylamide or (K) a mixture of (G) and (H).

2. A method as claimed in claim 1 wherein the substrate surface is of building cement or concrete.

3. A method as claimed in claim 1 wherein the polyester is an air drying alkyd resin.

4. A method as claimed in claim 1 wherein the primer composition comprises by weight from 25 to 40% by weight of the cyclised rubber resin (a) and from 3 to 15% by weight of a film-forming alkyd resin (b), the remainder being one or more volatile organic solvents and optionally one or more driers for (b).

5. A method as claimed in claim 4 wherein the organic solvent component comprises xylene and petroleum ether.

* * * * *